United States Patent [19]
Walker

[11] 3,849,317

[45] Nov. 19, 1974

[54] ADDITIVE FOR REDUCING GEL STRENGTH IN AQUEOUS LIME CONTAINING DRILLING FLUIDS

[75] Inventor: Thad O. Walker, Houston, Tex.

[73] Assignee: Texaco Inc., New York, N.Y.

[22] Filed: Dec. 18, 1972

[21] Appl. No.: 315,955

[52] U.S. Cl. ............................. 252/8.5 A, 175/65
[51] Int. Cl. ......................... E21b 21/04, C09k 3/00
[58] Field of Search ..................... 252/8.5 A; 175/65

[56] References Cited
UNITED STATES PATENTS
3,728,259  4/1973  Christman........................ 252/8.5 A

OTHER PUBLICATIONS

Hurdle, The Oil and Gas Journal, Oct. 28, 1957, pp. 93 to 95, TN 860.039.

*Primary Examiner*—Leland A. Sebastian
*Attorney, Agent, or Firm*—T. H. Whaley; C. G. Ries

[57] ABSTRACT

The gel strengths and yield points of aqueous drilling fluids which are saturated with calcium hydroxide or lime may be reduced by adding to the drilling fluids an effective amount of a hydrolyzed cereal solid, which is predominantly a hexa-saccharide and higher polysaccharides.

6 Claims, No Drawings

3,849,317

ADDITIVE FOR REDUCING GEL STRENGTH IN AQUEOUS LIME CONTAINING DRILLING FLUIDS

FIELD OF THE INVENTION

This invention relates to a novel additive for aqueous drilling fluids and a method for drilling wells in subsurface formations utilizing drilling fluids containing said additive, and particularly to an additive for reducing the gel strengths and yield points of aqueous drilling fluids which are saturated with calcium hydroxide.

PRIOR ART

Drilling fluids, or drilling muds as they are sometimes called, are slurries of clayey solids used in the drilling of wells in the earth, such as are drilled for the purpose of tapping subterranean deposits of petroleum, gas, and other fluid materials. Drilling fluids have a number of functions, the most important of which are removing formation cuttings from the well, sealing off permeable formations of gas, oil or water which may be encountered at various levels as the well is drilled into the subterranean formation, cooling and lubricating the drilling tool and drill pipe which carries the tool, and holding the cuttings in suspension in the event of shut down in the drilling and pumping of the drilling fluid.

An ideal drilling fluid is a thixotropic fluid, i.e., a fluid whose viscosity decreases as the degree of agitation or shear rate increases. In the drilling of wells utilizing drilling fluids, agitation or shear is caused by pumping or otherwise circulating the fluid through the drill string. When the agitation or shearing caused by circulation is halted, however, the fluid gels or forms a gel structure which will support the drill cutting to prevent them from falling down into the bottom of the hole. The rate of gel formation must be such as to permit the cuttings to fall only a short distance before the gel structure is sufficiently strong to support them. It is important to maintain the degree of gelation and the rate of gelation within narrow limits, since excessive gel formation would be detrimental to the resumption of drilling operations, and will also tend to entrain gas in the drilling fluid. Entrainment of gas in the drilling fluid leads to a substantial reduction in the density of the drilling fluid, which can be detrimental to continued safe drilling of the well especially if high pressure formations are to be encountered. If the gelation rate and gel strength is below the desired range, formation cutting and other solid materials such as weighting material will fall to the bottom of the hole which results in sticking of the drill pipe.

Special purpose drilling fluids are used in certain geographical areas where the well must penetrate formations known as heaving or sloughing shales. An aqueous drilling fluid containing excess calcium hydroxide and other water soluble calcium salts and having a prescribed alkalinity is described in U.S. Pat. No. 2,802,783 (1957), W. J. Weiss et al., and this drilling fluid has been very successful for drilling the type of "mud making" heaving shales encountered in the Gulf Coast Region. A distinctly different aqueous fluid for controlling a different type of heaving shales is disclosed in copending application, Ser. No. 309,327 filed Nov. 24, 1972, which has been used successfully for drilling Illitic, non-mud making heaving shales encountered in the Delaware Basin area of West Texas and New Mexico, specifically the Pennsylvanian-Mississippian interval. This latter drilling fluid, a low solids shale control drilling fluid, is also saturated with respect to calcium hydroxide and has some excess or undissolved calcium hydroxide dispersed therein. It is otherwise quite distinct from the first mentioned shale control mud in that it is a highly flocculated system, being characterized by an API water loss in excess of 100 cc's, a ratio of yield point to plastic viscosity less than 1, and has a high tolerance for sodium chloride, even permitting the use of saturated sodium chloride brine for formulation of the drilling fluid.

Most drilling fluids, including the first described shale control drilling fluid, are responsive to conventional dispersants or thinners insofar as gel strengths and yield points are concerned. This is not true in the instance of the low solids shale controlling drilling fluid disclosed in copending application, Ser. No. 309,327 filed Nov. 24, 1972, especially when this fluid is saturated with both calcium hydroxide and sodium chloride. Accordingly, there is a substantial need for an additive for use in an aqueous drilling fluid which is saturated with respect to calcium hydroxide, and which may also be saturated with respect to sodium chloride, which additive is capable of reducing the gel strengths and yield points of such drilling fluids to the desired critical operating range, such that neither gas entrainment nor solids settling occurs.

SUMMARY OF THE INVENTION

The gel strength of an aqueous drilling fluid which is saturated with respect to calcium hydroxide, and which may contain excess or undissolved calcium hydroxide, and which may further be saturated with respect to sodium chloride, are effectively reduced by treating the drilling fluid with a hydrolyzed cereal solids composition which consists essentially of polysaccharide, principally hexa-saccharide and above. From about ⅛ to about 8 pounds of the material per barrel of drilling fluid may be used, and preferably from ½ to 3 pounds of the material per barrel of drilling fluid will achieve a desirable reduction in gel strength and yield point.

DESCRIPTION OF THE PREFERRED EMBODIMENTS

This invention pertains to a novel additive for an aqueous lime containing drilling fluid for reducing the gel strength and yield point of the drilling fluid. The material is a hydrolyzed cereal solids, a food additive whose carbohydrate composition is given in Table I below.

TABLE I

| Composition of Hydrolyzed Cereal Solids | |
|---|---|
| Dextrose | 1% |
| Di-saccharide | 4% |
| Tri-saccharide | 5% |
| Tetra-saccharide | 4% |
| Penta-saccharide | 4% |
| Hexa-saccharide and above | 82% |

The material is available commercially under the tradename MOR-REX from CPC International Inc. The material is available in a granular form for use in food products as a nutritive bulk agent. It is typically available with approximately 5 percent moisture and has a pH of from 4.5 to 5.5.

The class of aqueous drilling fluids for which this additive is especially desirable for the purpose of reducing gel strengths and yield points, are aqueous drilling fluids having calcium hydroxide or lime dissolved therein, especially those having an aqueous phase saturated with respect to calcium hydroxide and containing excess, undissolved calcium hydroxide. The shale control drilling fluid and low solids shale control drilling fluid for which this additive is especially useful have an aqueous phase saturated with respect to calcium hydroxide and also have undissolved calcium hydroxide dispersed in the drilling fluid. The low solids drilling fluid for which the additive was initially developed and in which it is especially suitable for use is characterized by having a filtrate soluble calcium level in excess of 200 and preferably in excess of 1,000 parts per million, and a filtrate alkalinity greater than 0.5 milliliters of 0.02 normal sulfuric acid per milliliter of filtrate. The whole drilling fluid will also typically have at least one pound per barrel of excess undissolved calcium hydroxide. The rheology of the whole drilling fluid is uniquely characterized by the ratio of plastic viscosity to yield point being not greater than 1 and an unusually high API filtration rate, in the range of 100 milliliters or more. The gel strengths of such fluids, particularly the low solids drilling fluids, are not normally excessive and it is not unusual to drill a relatively long segment of hole using a low solid drilling fluid and maintain the desired rheological property without the use of any additional dispersant or thinner. Ordinarily, water is used to control the plastic viscosity and yield point, and when these parameters are held within the prescribed limits, the gel strengths are within a desirable range. Problems arise, however, in several fashions when the well is drilled through fairly long intervals. After the drilling operation has been continuing for a substantial period of time, an appreciable amount of formation solids are dispersed in the drilling fluid. Although montmorillonitic type clays do not yield in the highly chemicalized aqueous phase of the low solid shale control drilling fluid, they are dispersed therein and tend to increase the plastic viscosity and yield point. Watering will generally reduce the plastic viscosity and yield points. If weighting material such as barite has been added to the drilling fluid to increase its density or mud weight, however, watering can become quite expensive because of the necessity of adding additional weighting material; therefore, some type of chemical dispersant must be resorted to. The upper limit or tolerable gel strength is determined by the tendency for air and other gases to become dispersed and entrained in the drilling fluid. The entrainment of air or other gases in drilling in drilling fluid produces a fluffy material having undesirable rheological properties, and also causes a drastic drop in the density or mud weight of the drilling fluid. The optimum range of gel strengths for a low solids shale control drilling fluid is determined principally by the drilling fluid specific gravity (mud weight). For a drilling fluid having a specific gravity of 10 pounds per gallon or less, the optimum gel strengths are from $0^2$ to $0^{10}$ initial and from $0^2$ to $0^{40}$ 10 minute.

The concentration of hydrolyzed cereal solids necessary to reduce the gel strength of a drilling fluid to the desired range will depend on the original gel strength of the fluid as well as on other factors. Generally, it is preferable to pilot test the response to determine the optimum concentration. Very slight adjustments may require as little as ⅛ pound of hydrolyzed cereal solids per barrel of drilling fluid, and in extreme cases as much as 8 pounds per barrel may be required. Generally, the desired reduction in gel strength will be achieved by using from about ½ to about 3 pounds of hydrolyzed cereal solids per barrel of drilling fluid.

It has become common practice to those skilled in the art of drilling fluid technology to measure gel strengths by the use of a shearometer tube. A measured quantity of drilling fluid is placed in a container and shaken, and the shearometer tube is dropped into the drilling fluid immediately after the shaking or other agitation is terminated. If the shearometer tube sinks only part way into the drilling fluid contained in the container during a 60 second time interval, the tube is removed and the depth that it penetrated the fluid is measured. The drilling fluid is allowed to stand without further agitation for 10 minutes, and the test is repeated. Again, if the shearometer tube sinks only part way to the bottom of the container, the depth of penetration is measured. If the shearometer sink 3 centimeters in the test conducted immediately after agitation, and sinks 5 centimeters after the drilling fluid has stood without further agitation for 10 minutes, the gel strength is indicated as 3–5. If on the other hand, the shearometer tube drops to the bottom of the container in less than 60 seconds, the time required for the shearometer tube to drop all the way to the bottom of the container is noted. If the tube drops to the bottom of the container in 15 seconds for example, the gel strength is indicated as $0^{15}$. Thus, in the course of measuring a gel strength of a drilling fluid, the shearometer tube dropped to the bottom of the container in 10 seconds in the test conducted immediately after agitation, and drops to the bottom in 30 seconds after the drilling fluid has stood without further agitation for 10 minutes, the drill strength is indicated as $0^{10} - 0^{30}$.

Experimental

The hydrolyzed cereal solids additive was tested in a low solid shale control mud and the data are contained in Table II below. For comparison purposes, the same mud was treated with the same concentrations of two commercially available drilling fluid dispersants, and the resultant rheological properties are also included in the table. As can be seen from the data in Table II, the hydrolyzed cereal solid was extremely effective as a gel strength reducer, and only two pounds per barrel effectively reduced the gel strength from 5.7 – 4.8 to $0^1 - 0^2$. Neither of the commercially available materials perform satisfactorily at the two pounds per barrel treatment level. Use of four pounds per barrel of the hydrolyzed cereal solids resulted in a $0^1 - 0^1$ gel, indicated that no tendency to overload was noted. Four pounds per barrel of the commercially available dispersants did succeed in reducing the gel strength of the low solid shale control mud $0^1 - 0^2$.

TABLE II

LOW SOLIDS SHALE CONTROL DRILLING FLUID

| Run | Additive | Pounds Per Barrel | Fann VG Meter 300 RPM | Fann VG Meter 600 RPM | PV[1] | YP[2] | AV[3] | Gel Strength 0 | Gel Strength 10 min. |
|---|---|---|---|---|---|---|---|---|---|
| 1. | — | — | 34.5 | 25.5 | 9 | 16.5 | 17.3 | 5.7 | 4.8 |
| 2. | Hydrolyzed Cereal Solids | 2 | 20.0 | 13.0 | 7 | 6 | 10.0 | 0[1] | 0[2] |
| 3. | Hydrolyzed Cereal Solids | 4 | 14.5 | 7.5 | 7 | 0.5 | 7.3 | 0[1] | 0[1] |
| 4. | Calcium Lignosulfonate | 2 | 22.0 | 16.5 | 5.5 | 11.0 | 11.0 | 3.3 | 3.2 |
| 5. | Calcium Lignosulfonate | 4 | 18.5 | 12.0 | 6.5 | 5.5 | 9.3 | 0[1] | 0[2] |
| 6. | Ferro Chrome Ligno-sulfonate | 2 | 22.5 | 15.5 | 7.0 | 8.5 | 11.3 | 3.5 | 3.2 |
| 7. | Ferro Chrome Ligno-sulfonate | 4 | 18.5 | 11.5 | 7.0 | 4.5 | 9.3 | 0[1] | 0[2] |

[1] PV = plastic viscosity, calculated by subtracting the 300 rpm reading on a Fann VG Meter from the 600 rpm reading.
[2] YP = yield point, calculated by subtracting the 300 rpm reading on a Fann VG Meter from the yield point.
[3] AV = apparent viscosity, calculated by dividing the 600 rpm rereading of a Fann VG Meter by 2.

The results contained in Table II are surprising for several reasons. The two dispersants used are both excellent materials, usually quite effective for dispersing calcium containing drilling fluids, and it would be expected that they would function more satisfactorily in this drilling fluid. The calcium lignosulfonate used was Kembreak and the ferro chrome lignosulfonate was Q-broxin. Both materials are normally used in calcium containing drilling fluids but they were relatively ineffective for reducing the plastic viscosity or gel strength of the low solid shale control drilling fluid of this test. Moreover, carbohydrate materials, specifically prehydrolyzed starch, a known additive for drilling fluids, commonly used for decreasing the filtration rate or water loss of drilling fluids, generally tend to increase rather than decrease the gel strength, and generally cause an increase in the plastic viscosity. Quite the reverse was observed in the test, the data for which is contained in Table II, and the material appears to be a very excellent dispersant for the flocculated low solids shale control drilling fluid used in the tests.

In order to determine the applicability of the additive of this invention to other types of drilling fluids, tests were conducted in a low pH drilling fluid and in a sea water mud. As can be seen in Table III, the hydrolyzed cereal solid was relatively ineffective for reducing the gel strength of either a low pH mud or a sea water mud. Thus, the material has a specific application to systems containing calcium hydroxide or lime.

As can be seen from the data contained in Table III, the novel additive of the subject invention was essentially ineffective for improving the rheology of a low pH drilling fluid, whereas the conventional ferro chrome lignosulfonate produced excellent rheological properties; moreover, the material of this invention was totally ineffective for improving the rheology of the sea water mud.

Thus, the above data established that the hydrolyzed cereal solid of the subject invention was quite effective for reducing the yield point and gel strength of an aqueous drilling fluid which is saturated with and contains excess or undissolved calcium hydroxide, but is completely ineffective for a more conventional low pH drilling fluid. This is somewhat unique, since most of the dispersants which will function in the high calcium environment of a saturated lime drilling fluid will also work quite well in the low pH fluids (although the converse is not necessarily true). Similarly, the hydrolyzed cereal solids of the subject invention will not function to reduce the yield point of rheological properties of a sea water mud as is illustrated by lines 13 and 14 of Table III. Since sea water muds are highly flocculated muds as are the low pH shale control fluids, this is again a somewhat unexpected result. The response to the treatment with the hydrolyzed cereal solids of the subject invention is uniquely restricted to aqueous drilling fluids containing calcium hydroxide.

Field Experimentation

TABLE III

LOW pH AND SEA WATER DRILLING FLUIDS

| Run | Drilling Fluid System Type | Additive | Lbs/Bbl. Additive | FANN VG METER 300 RPM | FANN VG METER 600 RPM | PV[1] | YP[2] | AV[3] | Gel Strength 0 | Gel Strength 10 min. |
|---|---|---|---|---|---|---|---|---|---|---|
| 8. | Low pH Fluid | — | — | 72.0 | 58.0 | 14.0 | 44.0 | 36.0 | 27 | 40 |
| 9. | Low pH Fluid | Hydr. Cereal Solids | 2 | 74.5 | 55.0 | 19.5 | 35.5 | 37.3 | 20 | 35 |
| 10. | Low pH Fluid | Hydr. Cereal Solids | 4 | 66.0 | 47.0 | 19.0 | 28 | 33 | 14 | 27 |
| 11. | Low pH Fluid | Ferro Chrome Lignosulfonate | 4 | 36.0 | 18.0 | 18.0 | 0 | 18.0 | 0[1] | 0[1] |
| 12. | Sea Water Mud | — | — | 130 | 121 | 9.0 | 112 | 65 | — | — |
| 13. | Sea Water Mud | Hydr. Cereal Solids | 2 | 126 | 115 | 11 | 104 | 63 | — | — |
| 14. | Sea Water Mud | Hydr. Cereal Solids | 4 | 119 | 110 | 9 | 101 | 60 | — | — |

[1] PV = plastic viscosity, calculated by subtracting the 300 rpm reading on a Fann VG Meter from the 600 rpm reading
[2] YP = yield point, calculated by subtracting the 300 rpm reading on a Fann VG Meter from the yield point.
[3] AV = apparent viscosity, calculated by dividing the 600 rpm rereading of a Fann VG Meter by 2.

Based on the results obtained in the previously described laboratory experiments, a field trial was undertaken in a field low solids shale control drilling fluid being utilized to drill the Moise Cerf(NCT)1 Well no. 1, Pecos County, Tex. The test was initiated in the course of drilling at about 16,000 feet depth, which concided with the drilling of cement. Preliminary tests were conducted utilizing the base low solids shale control drilling fluid being used in the top hole section of the drilling fluid at a time immediately prior to initiation of the test, and the response to treatment data is contained in Table IV below.

TABLE IV

RHEOLOGICAL PROPERTIES OF CERF NO. 1 LOW SOLIDS SHALE CONTROL DRILLING FLUID

| Run | Treatment Lb/Bbl Hydrolyzed Cereal Solids | PV[1] | YP[2] | Gels 0 – 10 min. |
|---|---|---|---|---|
| 15. | 0 | 7.0 | 10 | 3 – 6 |
| 16. | 1 | 6.5 | 7 | $0^3 - 0^5$ |
| 17. | 2 | 7.0 | 3.5 | $0^1 - 0^2$ |
| 18. | 3 | 7.0 | 2.0 | $0^1 - 0^1$ |

[1] PV = plastic viscosity, calculated by subtracting 300 rpm Fann VG Meter reading from 600 rpm reading
[2] YP = yield point = PV - 300 reading on Fann VG Meter As can be seen, the gel strengths are reduced quite effectively by only one pound per barrel of the hydrolyzed cereal solids, and were reduced to very low levels by the use of 2 and 3 pounds per barrel of cereal solids. The gel reduction was so extreme in the instance of 2 and 3 pound per barrel cereal solids that the barite which had been previously added to the drilling fluid to increase its specific gravity, tended to settle to the bottom of the container. Whereas the 3 – 6 gel readings are too high and tended to cause gas entrainment, the $0^1 - 0^1$ gel readings were too low. It was felt that the $0^3 - 0^5$ gel reading was about optimum and so the field experiment was conducted utilizing one pound per barrel of hydrolyzed cereal solids.

Treatment was made assuming that the total volume of drilling fluid being employed at the time of the drilling of the well was approximately 1,500 barrels, and so 1,500 pounds of hydrated cereal solids were used. One pound per barrel of fluid was added to the drilling fluid over the course of one complete circulation, which required addition of the hydrolyzed cereal solid at the rate of approximately one 50 pound sack of material every 30 minutes. Funnel viscosity and Fann VG Meter measurements were made and recorded during this treatment period on both the drilling fluid being returned from the well and also on mud leaving the mud pit in which treatment was effected and being pumped back into the well. Selected typical results are given in Table V below.

TABLE V

FIELD DRILLING FLUID TEST RESULTS

| | Fluid Returning From Well | | | | | Fluid Being Pumped Into Drill String | | | | |
|---|---|---|---|---|---|---|---|---|---|---|
| Run | Funnel Viscosity Seconds | PV[1] | YP[2] | Gel Strength 0 | Gel Strength 10' | Funnel Viscosity Seconds | PV[1] | YP[2] | Gel Strength 0 | Gel Strength 10' |
| 19 | 35 | 6.5 | 6.5 | $0^3$ | $0^5$ | 37 | 6.5 | 12 | 4 | 4 |
| 20 | 35 | 7.0 | 6.5 | $0^2$ | $0^2$ | 35 | 6.5 | 7.5 | $0^1$ | $0^4$ |

[1] PV = plastic viscosity, calculated by subtracting the 300 rpm reading on a Fann VG Meter from the 600 rpm reading.
[2] YP = yield point, calculated by subtracting the 300 rpm reading on a Fann VG Meter from the yield point.

Line 19 represents typical values experienced before the treatment was initiated. As can be seen, the gel strengths were reduced to a desired range of $0^3-0^5$ prior to being pumped into the well, although they were returning with gels of 4—4 which were sufficiently high to cause gas entrainment. Run 20 gives the rheological properties of mud returning from and being pumped back into the well several hours after the complete treatment had been made. It can be seen that the rheology had stabilized to the desired range, and that the gel strength of the fluid returning from the well was essentially similar to the gel strength of the fluid being pumped into the well. The gel strength measurement remained relatively constant after the treatment, and no additional or supplemental treatment was required for the continuation of drilling.

Thus it can be seen that I have disclosed and demonstrated by both the laboratory evaluation and actual field utilization, that the use of from ⅛ to 8 pounds per barrel and preferably from ½ to 3 pounds per barrel of a hydrolyzed cereal solid which is comprised of around 80 percent or more hexa-saccharide and above, and around 20 percent or less di-saccharides through penta-saccharide, will effectively reduce the yield point and gel strength of a highly flocculated drilling fluid system which has an aqueous phase saturated with calcium hydroxide, and which contains excess or undissolved calcium hydroxide dispersed therein, which drilling fluid system is less responsive to commercially available dispersants. While numerous embodiments have been disclosed herein, other variations will be apparent to those skilled in the art of drilling fluid technology without departing from the true spirit and scope of my invention and it is desired that my invention be defined and limited only by the claims appended herein below.

I claim:

1. An aqueous drilling fluid having a liquid phase saturated with calcium hydroxide, containing as the additive for reducing gel strength and yield point, hydrolyzed cereal solids which is comprised of from about 15 percent to about 25 percent by weight di-saccharides, tri-saccharides, tetra-saccharides, and penta-saccharides, and from about 75 to about 85 percent by weight hexa-saccharides and above.

2. The drilling fluid as recited in claim 1 wherein from about ⅛ to about 8 pounds of the hydrolyzed cereal solid is added per barrel of drilling fluid.

3. The drilling fluid as recited in claim 1 wherein from about ½ to about 3 pounds of the hydrolyzed cereal solid is added per barrel of drilling fluid.

4. The drilling fluid as recited in claim 1 wherein the drilling fluid also contains undissolved calcium hydroxide.

5. The drilling fluid as recited in claim 1 wherein the drilling fluid also contains sodium chloride.

6. In a method of drilling wells in the earth wherein a drilling fluid is passed through the well in contact with earth formations during the drilling operations, the improvement which comprises contacting said earth formations with an aqueous drilling fluid whose filtrate phase is saturated with respect to calcium hydroxide and which further contains at least ⅛ pound per barrel of drilling fluid of a hydrolyzed cereal solid, said hydrolyzed cereal solid being comprised of at least 75 percent hexa-saccharide and above.

* * * * *